United States Patent [19]

Tharaldson

[11] 4,023,515
[45] May 17, 1977

[54] FLOATING WAVE POWERED PUMP

[75] Inventor: Leonard C. Tharaldson, Redlands, Calif.

[73] Assignee: American Cyanamid Company, Stamford, Conn.

[22] Filed: Dec. 8, 1975

[21] Appl. No.: 638,748

[52] U.S. Cl. .................................. 114/256; 9/8 P; 115/4; 417/332
[51] Int. Cl.² ........................................ F03C 1/26
[58] Field of Search ........... 115/4; 114/183 A, .5 T; 417/330, 331, 332; 9/8 P; 60/495, 497, 498, 506

[56] References Cited

UNITED STATES PATENTS

| 635,390 | 10/1899 | Rehart | 417/332 |
|---------|---------|--------|---------|
| 1,078,323 | 11/1913 | Trull | 417/332 |
| 1,295,170 | 2/1919 | Hudgins | 417/332 |
| 1,754,025 | 4/1930 | Lawrence | 417/332 |
| 1,766,457 | 6/1930 | Ruth | 417/332 |
| 2,436,517 | 2/1948 | Lewis | 417/332 |
| 2,871,790 | 2/1959 | Weills | 115/4 X |
| 3,002,484 | 10/1961 | Dube | 115/4 |
| 3,120,212 | 2/1964 | Delaney | 114/183 |
| 3,126,830 | 3/1964 | Dilliner | 417/331 |

*Primary Examiner*—Trygve M. Blix
*Assistant Examiner*—Gregory W. O'Connor
*Attorney, Agent, or Firm*—Harris, Kern, Wallen & Tinsley

[57] ABSTRACT

A wave powered pumping system including a floating platform and a plurality of floats hinged about the periphery of the platform. A double acting piston pump is provided on the platform for each float, with the float driving the piston of the pump utilizing both upward and downward movements of the float in a variable stroke operation. Nozzles for water jets may be carried on the platform below the water line to provide positioning and/or propulsion forces for the platform. In one embodiment, the platform is free floating; in another embodiment, the platform moves up and down with the swells and has a telescoping pipe anchor.

2 Claims, 4 Drawing Figures

FLOATING WAVE POWERED PUMP

This invention relates to wave powered pumping systems for utilizing the energy of waves and swells in bodies of water, particularly the oceans. A variety of devices have been proposed in the past for this purpose, including those shown in U.S. Pat. Nos. 635,390; 1,295,170; 1,754,025; 1,766,457; 2,436,517; and 3,120,212. The prior art devices have suffered from various disadvantages, and it is an object of the present invention to provide a new and improved wave powered pumping system which overcomes at least some of the disadvantages.

It is a particular object of the present invention to provide a wave powered pumping system which can accept swells and waves from any direction and of any magnitude and utilize both upward and downward movements. A particular object is to provide such a pumping system incorporating a variable stroke double action piston type pump which operates with both upward and downward movements of varying magnitude, without requiring any adjustments for tides and other variations.

It is a further object of the invention to provide a wave powered pumping system having improved efficiency and one utilizing a counterbalance pump configuration permitting reaction of all movements of the platform and floats. An additional object is to provide such a pumping system which can be utilized for water pumping directly and/or providing water under pressure for conversion to other forms of energy.

It is an additional object of the invention to provide a wave powered pumping system which may be self powered for maintaining its position or for propulsion.

Other objects, advantages, features and results will more fully appear in the course of the following description, where the drawings show and the description describes preferred embodiments of the present invention which are given by way of illustration or example.

Figure 1:
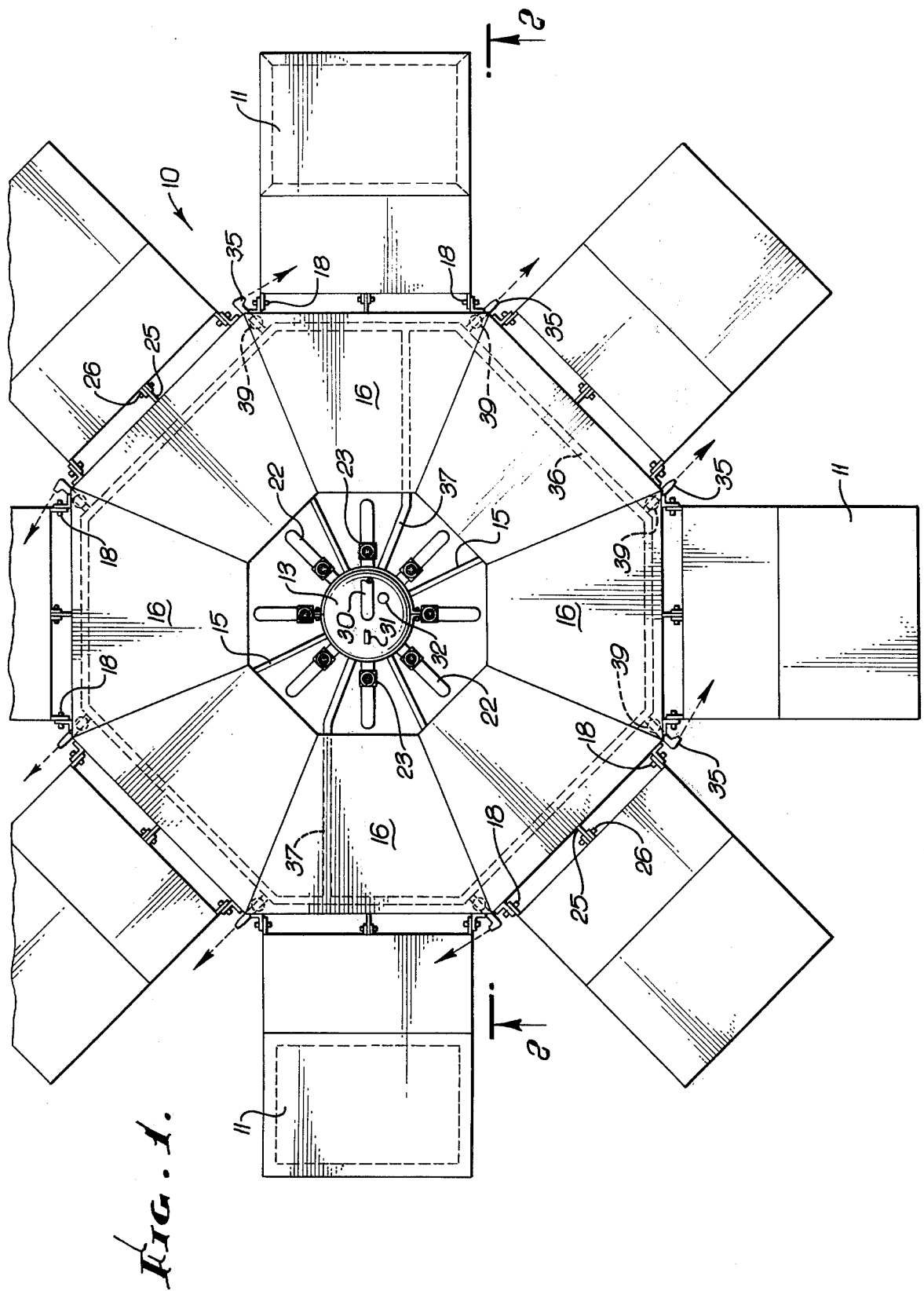
FIG. 1 is a top plan view of a floating pumping system incorporating the presently preferred embodiment of the invention.
Figure 2:
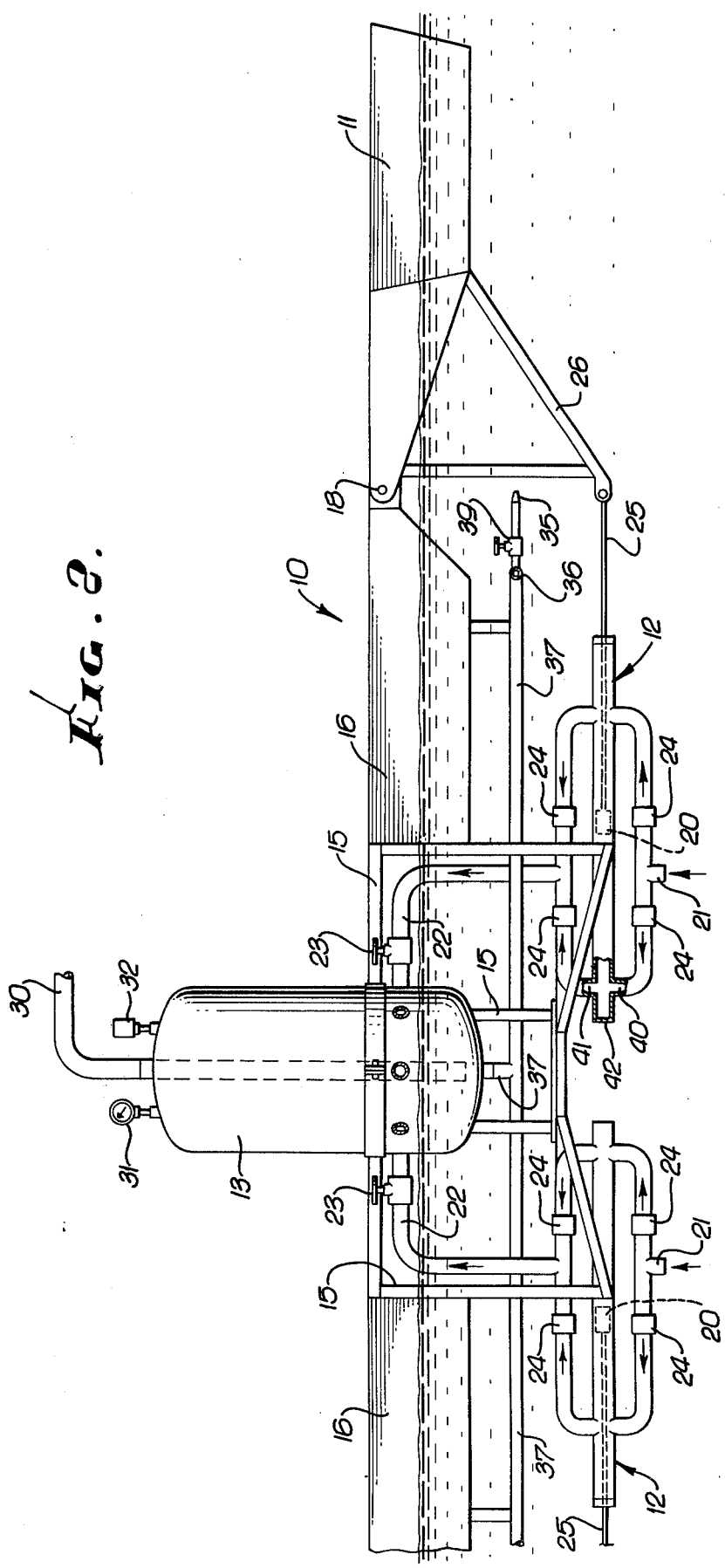
FIG. 2 is an enlarged partial sectional view taken along the lines 2—2 of FIG. 1.

The pumping system illustrated in FIGS. 1 and 2 includes a floating platform 10, a plurality of floats 11, and a pump 12 for each of the floats. An accumulator tank 13 is carried on the platform 10 which may comprise a plurality of interconnected framework members 15 and a plurality of float members 16 joined together and to the framework members. The particular construction of the platform 10 is not critical and is not a feature of the invention. The platform should be designed to float in the water supporting the pumps and tank.

Each of the floats 11 is pivotally mounted to the platform 10 for upward and downward motion relative to the platform, typically at hinge joints 18.

Each of the pumps 12 preferably is a double action piston pump operable with a variable stroke and providing pumping action for movement of the piston 20 in each direction. Each pump includes an inlet opening 21 positioned to be below the water line of the floating platform, and an outlet coupled to the tank 13 by a line 22. A control valve 23 may be positioned in the line if desired. Check valves 24 permit flow in the directions indicated by the arrows. The piston 20 is driven by piston rod 25 coupled to a bracket 26 of the float 11.

The tank 13 may be provided with an outlet line 30, a pressure gauge 31, and a safety valve 32, as desired.

In operation, any relative pivoting motion between a float and the platform provides a pumping action. Pumping action is achieved for any magnitude of pivoting without requiring any adjustment of the system. Also, the system operates with waves or swells coming from any direction. The water under pressure collected in the tank 13 may be drawn off through line 30 for any desired use. Also, the water pressure may be utilized to position and/or propel the platform through the water. A plurality of outlet nozzles 35 is fed from a manifold 36 coupled to the tank 13 by lines 37. The nozzles 35 are positioned below the water line of the platform and may be oriented as desired, with either fixed or adjustable orientation. Preferably, a control valve 39 is provided for each nozzle 35 for operation either manually or automatically to control nozzle operation. In the specific embodiment illustrated, four of the nozzles are oriented in one direction and four are oriented in the opposite direction. Four nozzles pointing in the same direction may be turned on at one time to provide a force tending to move the platform in the direction opposite the nozzle orientation.

Preferably the entire pumping mechanism is completely submerged below the water level, thereby obtaining proper lubrication of the piston rod in both directions of motion, and complete elimination of air leakage into the pumping system.

The piston and the pump discharge may be designed to provide a positive gradual stop at the end of the stroke. The inlet and outlet ports 40, 41 are spaced in from each end 42 of the pump cylinder. With a full stroke, the piston 20 closes the ports 40, 41 trapping water in the end of the cylinder. The trapped water leaks around the piston end to the ports slowly bringing the piston to a stop.

Figure 3:
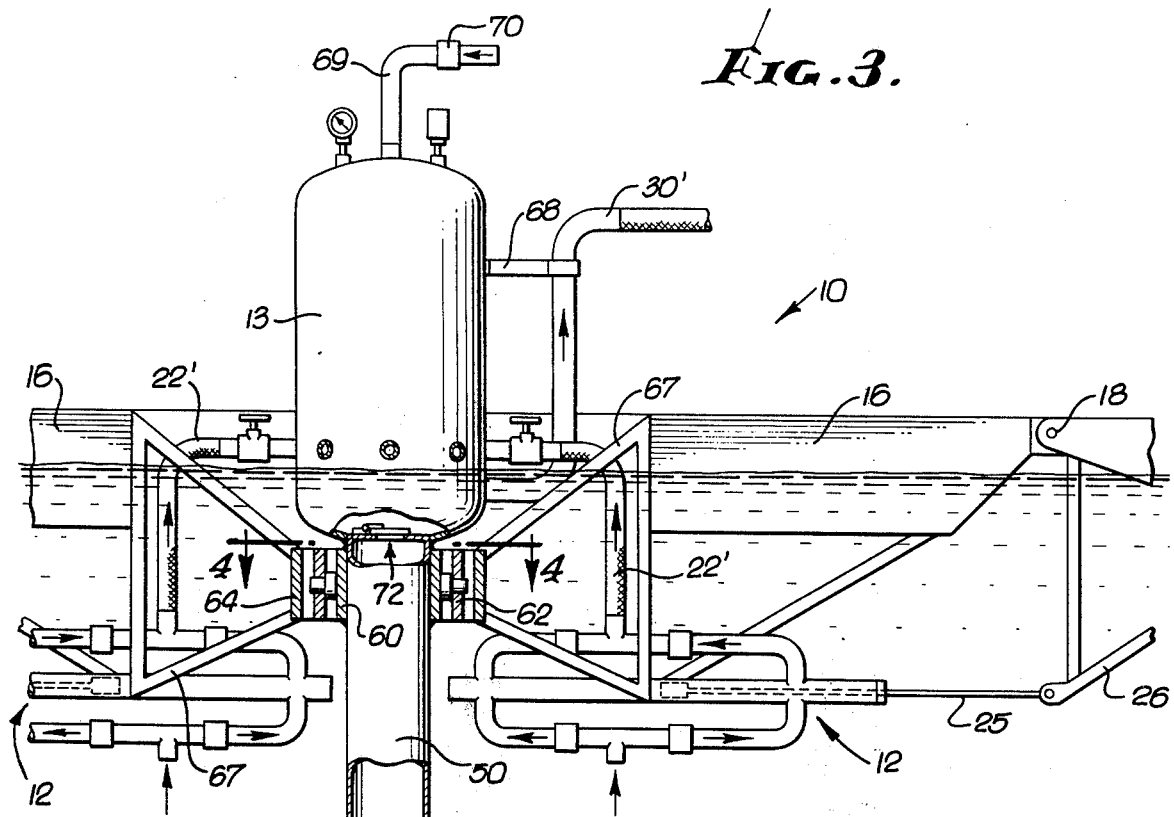
FIG. 3 is a view similar to FIG. 2 showing an alternative embodiment of the invention.
Figure 4:
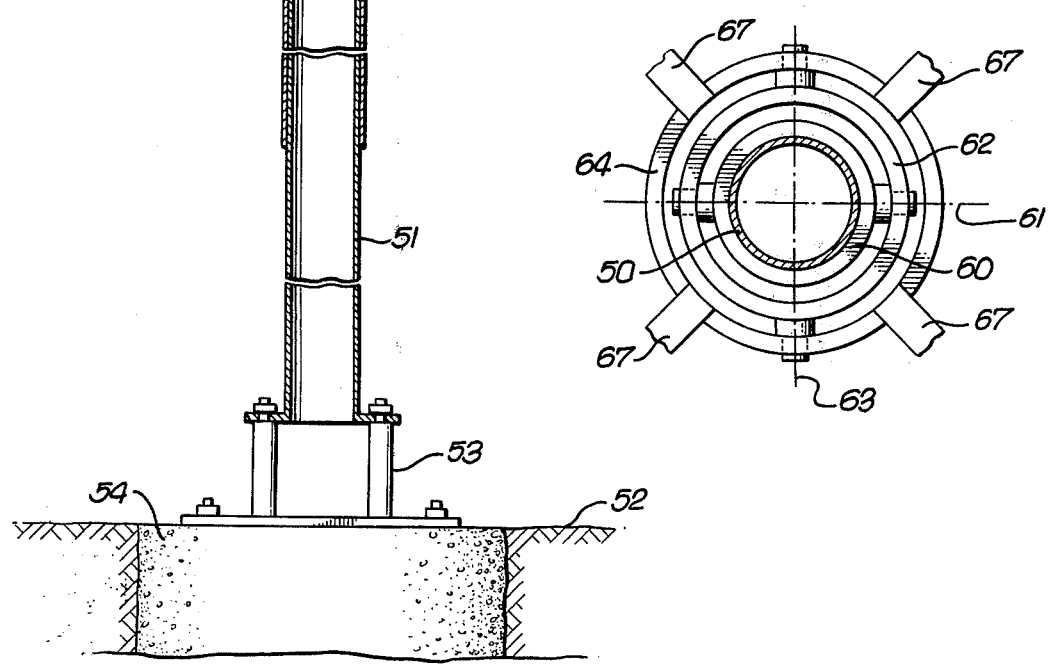
FIG. 4 is an enlarged sectional view taken along the line 4—4 of FIG. 3.

In the embodiment shown in FIGS. 3 and 4, the tank 13 is attached to the remainder of the platform 10 by a gimbal arrangement. Components corresponding to those shown in FIGS. 1 and 2 are identified by the same reference numerals.

A pipe 50 is fixed to the bottom of the tank 13 and slides over another pipe 51 which is anchored to the bottom 52, typically by bolting to a base 53 carried on a concrete foundation 54. A check valve 57 may be carried at the upper end of the pipe 51, and another check valve 72 may be carried at the upper end of the pipe 50.

The gimbal arrangement includes a ring 60 fixed to the pipe 50 and pivoting about a first axis 61 in another ring 62. The ring 62 pivots about a second axis 63 in another ring 64, with the axes 61, 63 being at right angles to each other. The ring 64 is supported on the platform 10 by struts 67.

Each of the pumps 12 is connected to the tank 13 through a flexible line 22'. An outlet line 30' is connected at the bottom of the tank and may be supported by a bracket 68. Another line 69 is connected at the top of the tank and includes a check valve 70 which permits flow of air into the tank.

In operation, as the platform rises to the top of a swell, the volume of the pipe 50 increases, drawing water into the pipe at relatively low pressure with the result that only a small upward force is applied to the anchor point. As the swell passes, the platform will remain in the upper position until the floats have descended, with the float motion producing the higher pressure output from the pumps. After the floats have reached their low points, the platform will descend, forcing water from the pipe 50 into the tank 13.

This construction permits anchoring of the platform while at the same time producing minimum stresses on the structure. The gimbal mounting permits motion of the platform in response to waves and swells from any direction. The platform may rise and fall with swells while providing a minimum stress on the anchor and providing additional pumping.

I claim:

1. In a wave-powered pumping system, the combination of:
   a floating platform;
   an accumulator tank carried on said platform;
   a plurality of pumps carried on said platform;
   means connecting the pump outputs to said tank, each of said pumps having an input opening below the water line of said platform;
   a plurality of floats;
   means mounting each of said floats to said platform for relative pivoting motion of the float and platform about a generally horizontal axis;
   means connecting each of said floats to a corresponding pump whereby relative pivoting of the platform and float actuates the pump;
   first and second vertically disposed telescoping pipes with the upper pipe connected to said tank and with the lower pipe adapted for anchoring; and
   a gimbaled mounting for supporting said tank on said platform.

2. A pumping system as defined in claim 1 wherein said gimbaled mounting includes an inner ring fixed to said upper pipe, an outer ring fixed to said platform, and an intermediate ring pivotally connected to said inner and outer rings.

* * * * *

UNITED STATES PATENT AND TRADEMARK OFFICE
CERTIFICATE OF CORRECTION

PATENT NO. : 4,023,515
DATED : May 17, 1977
INVENTOR(S) : Leonard C. Tharaldson

It is certified that error appears in the above—identified patent and that said Letters Patent are hereby corrected as shown below:

Page 1 (cover page), "American Cyanamid Company"

should be --Energy Saving Devices (E.S.D.) Research and Development Company--.

Signed and Sealed this ninth Day of August 1977

[SEAL]

Attest:

RUTH C. MASON
Attesting Officer

C. MARSHALL DANN
Commissioner of Patents and Trademarks